Jan. 14, 1930.  J. BARROW  1,743,307
METHOD OF AND APPARATUS FOR FORGE WELDING CYLINDERS AND THE LIKE
Filed Nov. 13, 1928  5 Sheets-Sheet 1
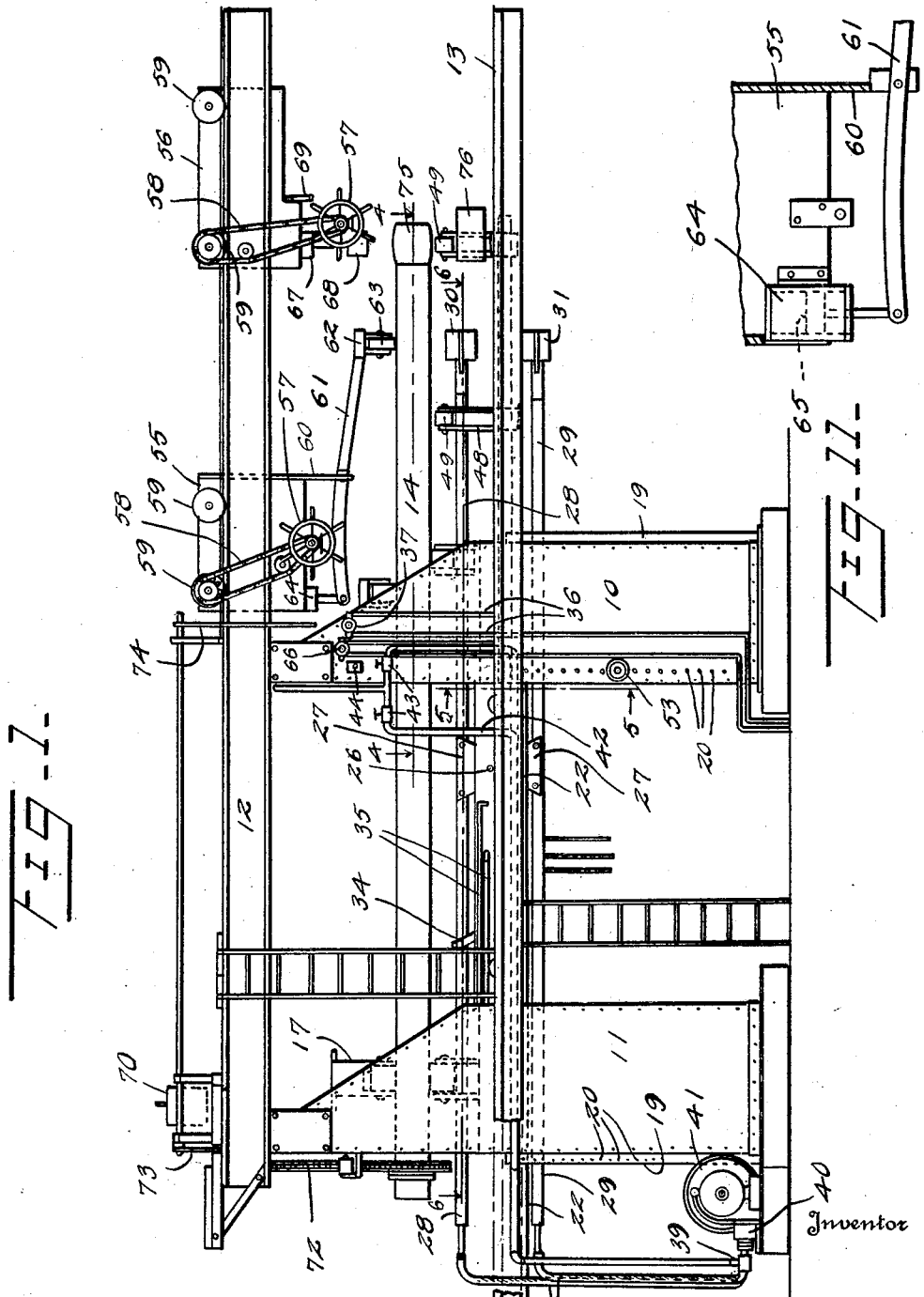
Inventor
John Barrow
By Watson E. Coleman
Attorney

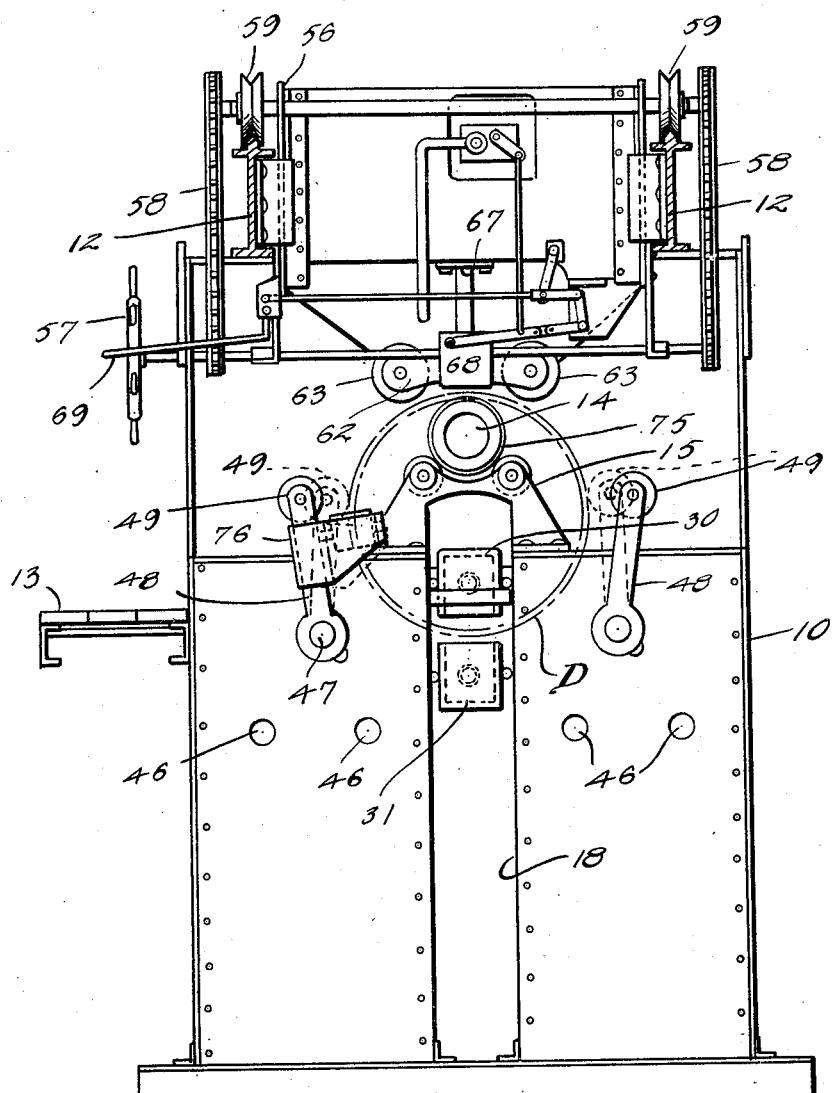

Jan. 14, 1930.  J. BARROW  1,743,307
METHOD OF AND APPARATUS FOR FORGE WELDING CYLINDERS AND THE LIKE
Filed Nov. 13, 1928   5 Sheets-Sheet 3
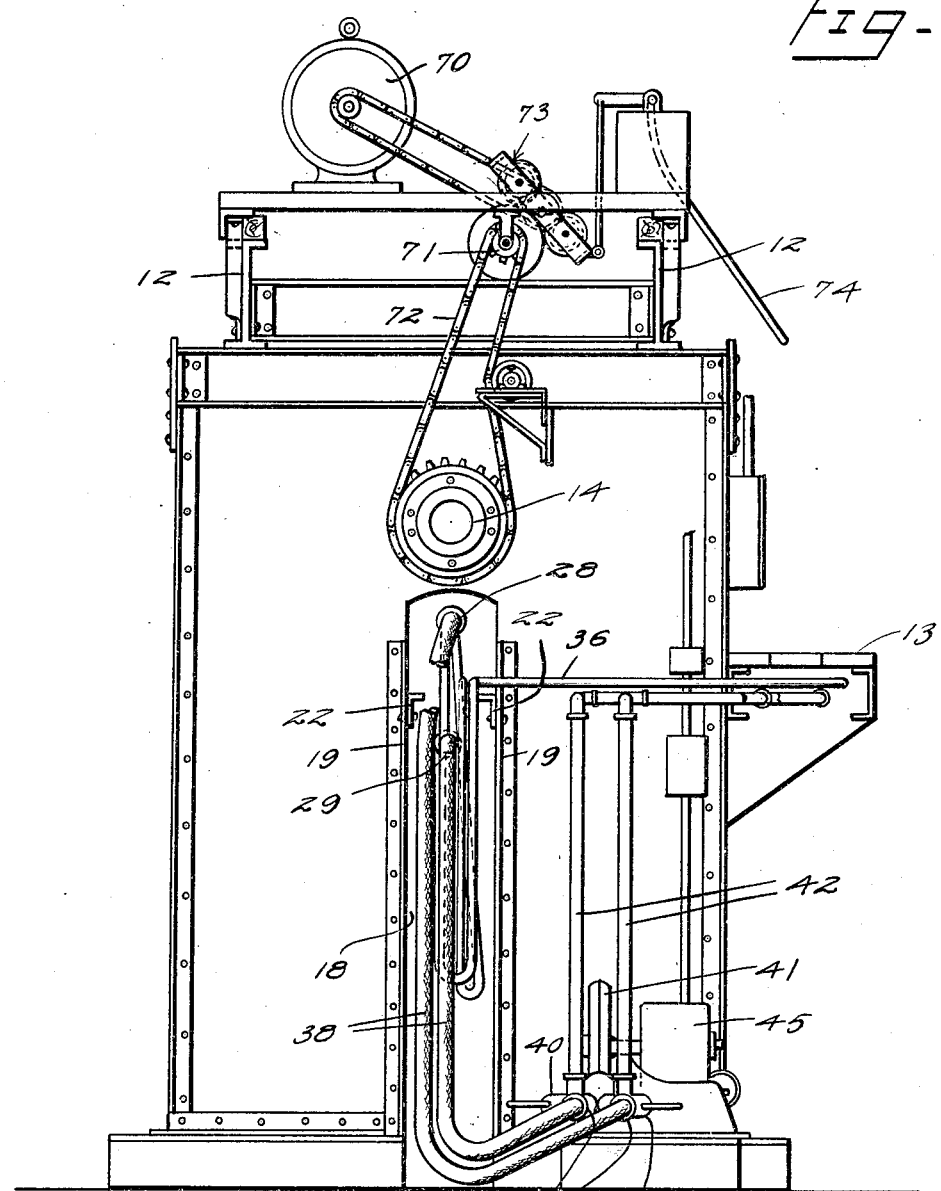
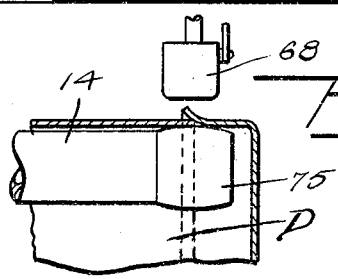
Inventor
John Barrow
By Watson E. Coleman
Attorney

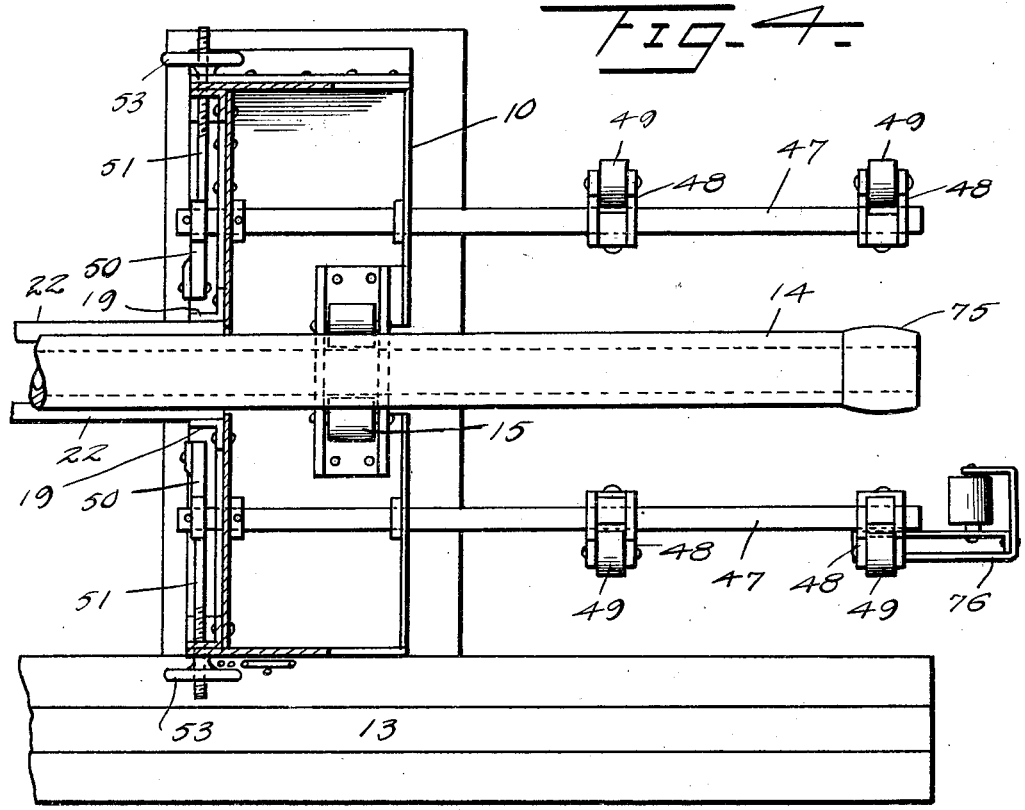
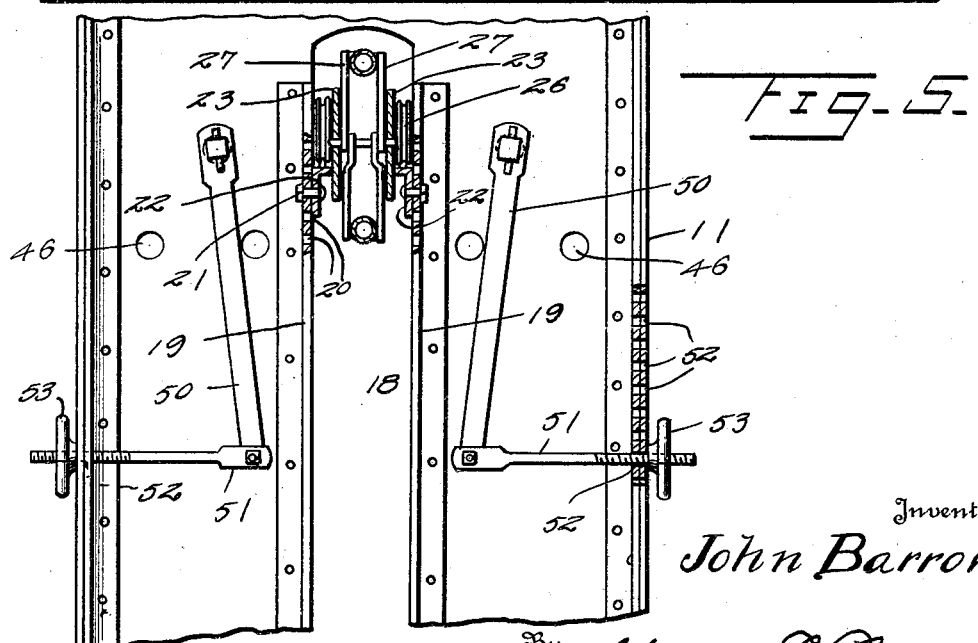

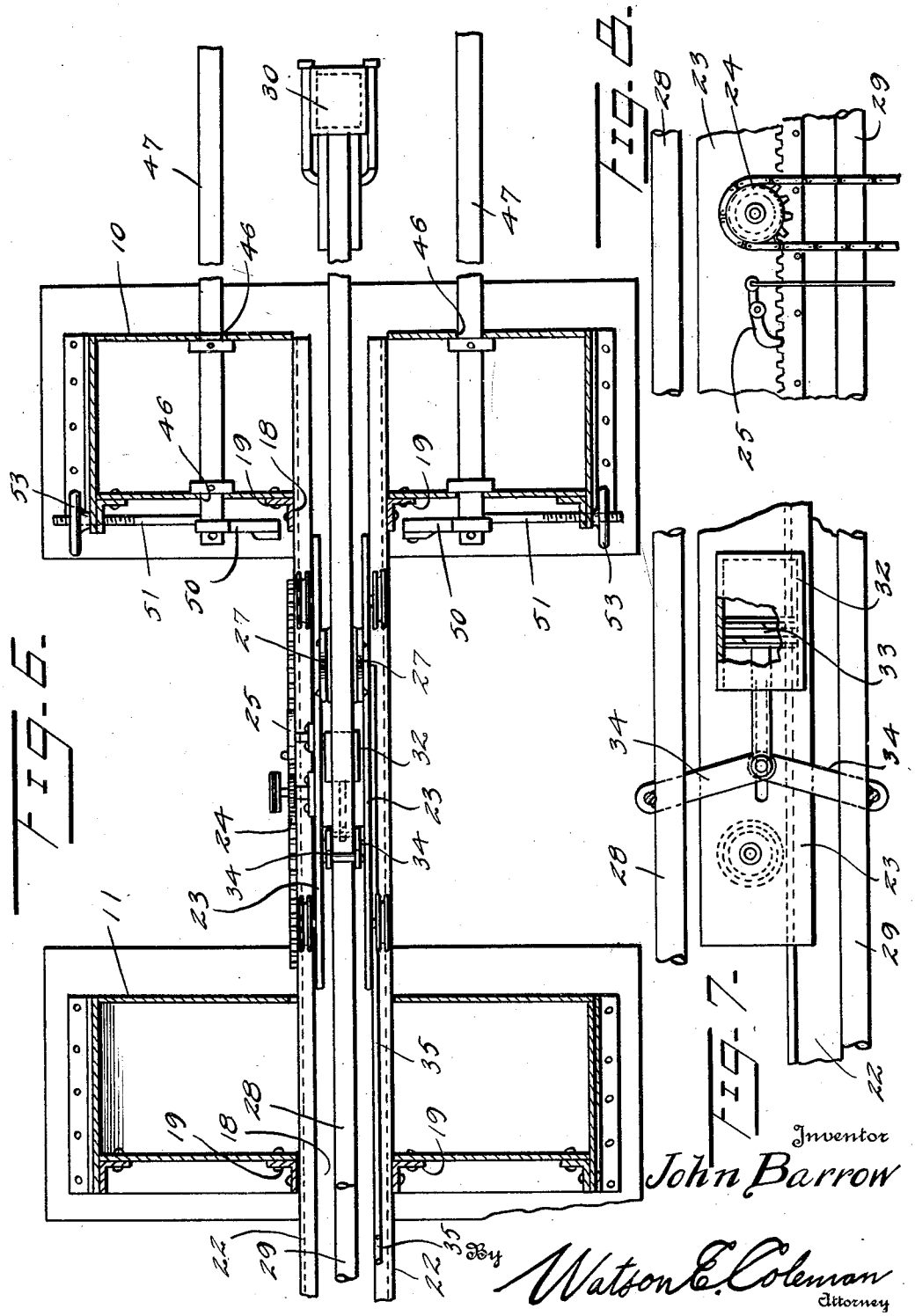

Patented Jan. 14, 1930

1,743,307

UNITED STATES PATENT OFFICE

JOHN BARROW, OF COLUMBIANA, OHIO

METHOD OF AND APPARATUS FOR FORGE WELDING CYLINDERS AND THE LIKE

Application filed November 13, 1928. Serial No. 319,041.

This invention relates to a method of and apparatus for welding the adjoining edges of steel or iron plates to form a forge welded container or cover of either the open or closed type, and more particularly to containers of the type illustrated by boilers or the like.

An important object of the invention is to provide a welding method permitting forge welding of large containers of this character and employing a novel system of presenting the seam to be welded to the forge fires and then to the action of the hammers by means of a mandrel from which the container is supported.

A further and more specific object of the invention is to provide apparatus for welding articles of this character which may be employed in the formation of either longitudinally or circumferentially extending seams and in which the seam is conveniently presented to first the forge fires and then the hammers by rotation of a mandrel from which it is supported.

A still further object of the invention is the provision of a structure of this character which is adjustable to permit its use with containers of varying diameters and of different characteristics and which may be very conveniently operated.

A further object of the invention is to provide a construction such that centralized control of the machine is secured, enabling the general functions of the machine to be conveniently controlled by a helper while the welder need only control the welding hammer in its operations.

A still further object of the invention is to provide a novel and improved means for holding the drum in position upon the mandrel during the welding operation.

These and other objects I attain by the construction shown in the accompanying drawings, wherein for the purpose of illustration is shown a preferred embodiment of my invention and wherein:—

Figure 1 is a side elevation of apparatus for forge welding cylinders constructed in accordance with my invention;

Figure 2 is a front elevation thereof;

Figure 3 is a rear elevation thereof;

Figure 4 is a section on the line 4—4 of Figure 1;

Figure 5 is a section on the line 5—5 of Figure 1;

Figure 6 is a section on the line 6—6 of Figure 1;

Figure 7 is a fragmentary sectional view of the forge fire control mechanism operating to separate and bring together the forge nozzles;

Figure 8 is a fragmentary side elevation showing the means for longitudinally adjusting the forge fires and for holding them in adjusted positions;

Figure 9 is a fragmentary sectional view showing the manner of forming the weld connecting a head to a cylinder;

Figure 10 is a fragmentary sectional view through the outer guide roller arm showing the guide carried thereby;

Figure 11 is a detail sectional view of the hold-down carriage showing the operating cylinder thereof.

Referring now more particularly to the drawings, the numerals 10 and 11 indicate longitudinally spaced front and rear supports in the form of columns, upon the upper ends of which longitudinal tracks 12 are supported, and along one side of which extends a welder's and helper's platform 13. Rotatably mounted in the supports 10 and 11 is a horn or mandrel 14, the support 10 having a supporting roller bearing 15 therefor while the support 11 has both supporting and hold-down roller bearings 16 and 17. The supports 10 and 11 are each vertically slotted below the mandrel, as indicated at 18, (see Figure 2) and the side walls of these slots have outstanding flanges 19, (see Figure 5), provided with vertically spaced perforations 20 to interchangeably receive the bolts or other securing elements 21 of a track 22 from which a carriage 23 is supported. This carriage may be adjusted longitudinally upon the trackway by a rack and pinion mechanism 24 and may be held in its adjusted position by a ratchet 25 shown in Figures 6 and 8.

This carriage is provided with a pivot 26 receiving ears 27 of a pair of pipes or conduits 28 and 29, the forward ends of which are in the form of blast nozzles 30 and 31 adapted to extend interiorly and exteriorly of the object to be welded such a, drum D, being shown in Figure 2, the nozzles discharging toward the drum. On the carriage 23 is a cylinder 32 of which the piston 33 has its rod linked, as at 34, to the conduits 28 and 29 (see Figure 7). Intake and exhaust pipes 35 are connected with the cylinder and through conduits 36 having flexible portions are led to a control valve 37 arranged at a point convenient to the platform 13.

It will be obvious that by properly operating this valve, the forge fires or blast nozzles 30 and 31 may be caused to separate from or approach one another, so as to permit the drum to be welded to be inserted therebetween and to permit rotation of this drum to bring the heated portion into engagement with the mandrel 14. The rear ends of the conduits 28 and 29 (as shown in Figure 3) are connected to flexible supply pipes 38 with air and gas mixers 39 to which air is supplied in quantities regulated by gates 40 from a blower 41 and gas is supplied through conduits 42 (in Figure 3) controlled by valves 43 disposed adjacent the valve 37. Adjacent the valve 37, a control switch 44 for the motor 45 of the blower is likewise located.

Directed through and rotatable in openings 46 in the front support 10 are shafts 47, one for each support, and each carrying in advance of the support a plurality of arms 48, shown as two in number, each having at its outer end a roller 49. These shafts at the rear of the support 10 have arms 50 secured thereto, the outer ends of which are connected to pull links 51, which are threaded and directed through openings 52 formed in flanges produced at the side faces of the supports as shown in Figure 5.

At the outer faces of the supports, hand wheels 53 are mounted upon the pull links to shift these links and thereby rotatably adjust the shafts 47. The shafts 47 are selectively engageable in any one of a plurality of the openings 46 of the leg of the support in which they are disposed, so that they may be adjusted toward and away from the mandrel 14 which they parallel to accommodate drums of varying diameters. The arms 48 are adjustable longitudinally of the shafts and are splined thereto, as indicated at 54. The tracks 12 support a pair of carriages 55 and 56, see Figure 1, each carriage having associated therewith means whereby it may be adjusted longitudinally of the trackway. These means in the present instance are illustrated as comprising rotatable hand wheels 57 chain-connected, as at 58, to one of the supporting wheels 59 of the carriage. Other suitable means may be provided for this adjustment, if so desired.

The carriage 55 may be termed a hold-down carriage and, as shown in Figure 1, includes a downwardly extending support 60, at the lower end of which is pivoted a lever 61 extending longitudinally of the mandrel and having at its forward end a cross head 62, the ends of which mount rollers 63 to engage the periphery of a drum mounted upon the mandrel. Mounted on the carriage is a cylinder 64, the piston 65 of which is connected to the rear end of the lever. The intake and exhaust of opposite ends of the cylinder 64 are controlled by a valve 66 arranged adjacent the valves 37 and 43. The carriage 56 may be termed a hammer carriage and mounts a hammer cylinder 67, the reciprocations of the pistons of which are automatic in the usual manner of such hammers. This piston has attached thereto a forging hammer 68 of any approved design.

Control of the operation of the hammer is through a lever 69 carried by the carriage and located conveniently adjacent the hand wheel 57 by means of which the carriage is shifted, so that the welder may have close control upon both the position of the hammer carriage and the operation of its hammer.

As shown in Figure 3, the means provided for rotating the mandrel 14 include a motor 70 supported upon the rear ends of the tracks 12, a shaft 71 chain-connected, as at 72 to the mandrel, and a reversing mechanism 73 connecting said motor and shaft and controlled by a lever 74 disposed adjacent the valves 37, 43 and 66. It will be noted that all of the controls, with the exception of the controls of the hammer carriage, are positioned at one point and that this point is convenient to the platform, so that a helper may control all of the operations of the machine except the actual operation of welding which will, of course, require the undivided attention of the welder. Attention is also directed to the fact that the helper's position is such that he may at all times view the welding operation and the position of the various accessory parts, so that he may observe whether these parts are properly positioned for the welding operation.

In use of the device, assuming that a sheet or a plurality of sheets bent in cylindrical form is to be joined in this cylindrical form by forge welding the longitudinal seams and the circumferential seam or seams whereby a head or heads is applied to the cylinder, the sheet after bending is first stitch-welded to temporarily hold it in proper position by means of oxy-acetylene or electric welding apparatus.

The cylinder is then placed upon the mandrel inwardly of an enlarged head 75 at the forward end thereof, the carriages 55 and 56 being retracted to permit its application by a chain hoist or the like (not herein disclosed). In this application, the shafts 47 may be disposed either interiorly or exteriorly of the cylinder, depending upon the diameter of the cylinder, and which mode of application is the most convenient, and prior to application, the tracks 22 are adjusted to such height that the blast nozzles 30 and 31 will be positioned to receive therebetween the wall of the drum at a point diametrically opposed to that resting upon the upper surface of the mandrel. The shafts 47 are rotated to bring the rollers 49 thereof firmly against the walls of the cylinder and the hold-down carriage 55 shifted to its proper position, which should be such that the cross head 62 will engage the cylinder adjacent its inner end and the piston 64 operated to bring the rollers 63 of this cross head into engagement with the upper surface of the cylinder to force it downwardly upon the mandrel. With these preparations completed, the forge fires provided by the blast nozzles 30 and 31 are adjusted until they align with one end of the mandrel when the piston 33 is operated to bring the nozzles into operative engagement with the inner and outer faces of the seam, the fires at this time being in operation. When the seam has been heated to the proper point, the blast nozzles are separated and the mandrel 14 rotated to bring the heated surface into position upon the upper surface of the mandrel. The hammer 68 is then actuated to forge the weld and after the forging operation, a second surface which is being heated during the forging operation is presented for a second forging operation. This is assuming that there are diametrically opposed longitudinal seams in the cylinder.

In welding the longitudinal seam of a drum or cylinder, the mandrel and the drum thereon are not moved longitudinally, it being understood, of course, that the cylinder is disposed inward of the head 75 of the mandrel so that the whole extent of the cylinder rests upon the mandrel. Then as the work progresses the hammer, the forge fires and the hold-down are, therefore, longitudinally of the cylinder as required. Of course, when circular seams are being welded the head of the anvil 75 is used. This is necessary in order to produce a level and round seam. By providing a rotating mandrel, it is possible to bring the heated portion which has been heated by the forge fires under the hammer much quicker than is possible where fixed mandrels are used and the cylinder or work is carried upon rollers because the fixed mandrel will obstruct the free rotation of the work unless the anvil or mandrel is moved downward out of contact with the work and then the work rotated and the anvil or mandrel brought back again. While the welding operation is being performed, the work is being moved back and forth over the mandrel and the hammer is striking all the while whereas where a non-rotating mandrel is used, it is necessary to stop the hammer, lower the mandrel, revolve the shell, raise the mandrel and again start hammering, etc. With the heating of the portion to be welded, a certain amount of scale forms and slag collects. On the machines with fixed mandrels, this slag and scale is embedded into the portion to be welded as soon as the mandrel is raised, whereas with the rotatable mandrel, the scale and slag are rolled out from the welding point rather than being pressed in.

If there is but a single seam, the heating and welding operations must, of course, be alternated. The longitudinal weld having been completed, the head is applied and the seam between the head and cylinder stitch-welded to temporarily hold the head in place. The seam, see Figure 9, is placed over the enlarged head 75 at the outer end of the mandrel and with the forge fires in continuous operation, the cylinder and its head may be rotated to successively heat portions of this seam and to bring the heated portions beneath the hammer for the forging operation. A head, in preparation for application to the cylinder, is belled or expanded at the outer end of the flange thereof, as indicated in Figure 9, so that the edges of the welded joint may be overlapped. By employing the enlarged head or knob at the outer end of the mandrel, the heated joint when completed will be slightly greater in diameter than the cylinder, so that when it cools, the shell will be straight, the welded seam having shrunk to the normal circumference thereof. It will be obvious that in applying a second head to a cylinder already equipped with one head, the mandrel may be inserted through the manhole opening of the already applied head and the knob or enlargement of the mandrel built up by means of sectional blocks or the like to support the cylinder.

It has been found in operation that by employing a rotating mandrel, the formation of anvil marks in the completed structure is avoided and furthermore the anvil side of the weld is free from scale, due to the rolling action of the mandrel against this face of the weld. In supporting the work, a guide 76 may be secured to one of the arms 48 for engagement therewith to prevent longitudinal movement of the work upon the mandrel.

The guide 76 as shown in Figure 10 preferably embodies a roller which engages against the end or head of the drum. However, this construction might be considerably modified and any suitable means may be employed for preventing longitudinal displacement of the work. Many modifications of a similar character being possible without in any manner departing from the spirit of my invention, I do not limit myself to the particular construction herein illustrated except as hereinafter claimed.

I claim:—

1. In a machine for forge welding the seams of metal cylinders and the like, a horizontal rotatable mandrel adapted to extend into and rotatably support the cylinder, the mandrel being cylindrical in cross section to have rolling contact with the cylinder, a forging hammer associated with the mandrel, blast heating nozzles located intermediate the ends of the mandrel but spaced from the mandrel and adapted to receive therebetween the walls of a cylinder into which the mandrel is extended, and means for rotating the mandrel in either direction, said hammer and heating nozzles being adjustable longitudinally of the mandrel, said heating nozzles being adjustable toward and away from the mandrel.

2. In a machine for forge welding the seams of metal cylinders and the like, a horizontal rotatable mandrel, cylindrical in cross section and adapted to extend into the cylinder and support the same and have rolling contact therewith and a forging hammer associated with the mandrel, blast heating nozzles located between the ends of the mandrel but spaced from the mandrel and adapted to receive therebetween the walls of a cylinder into which the mandrel is extended, means for rotating the mandrel in either direction, said heating nozzles and the hammer being adjustable longitudinally of the mandrel and said nozzles adjustable toward and away from the mandrel, and manually controllable means for shifting the heating nozzles toward and away from one another.

3. In a machine for forge welding the seams of metal cylinders and the like, a horizontally disposed rotatable mandrel, cylindrical in cross section, and adapted to extend into and rotatably support the cylinder by rolling contact therewith, manually controllable power operated means for rotating the mandrel in either direction, blast heating nozzles mounted for longitudinal movement parallel to the mandrel spaced therefrom and adapted to receive between them the wall of a cylinder into which the mandrel is extended, a forging hammer, means movable longitudinally of the mandrel for supporting the forging hammer, and hold-down means mounted above the mandrel for longitudinal movement.

4. In a machine for forge welding the seams of metal cylinders and the like, a horizontally disposed rotatable mandrel cylindrical in cross section and adapted to support and rotate a cylinder into which it is extended, manually controllable power operated mean for rotating the mandrel in either direction, blast heating nozzles manually shiftable parallel to the mandrel and adapted to receive therebetween the wall of a cylinder into which the mandrel is extended, said blast heating nozzles being adjustable toward or from the mandrel and adjustable toward or from each other, a forging hammer, means supporting the forge hammer for longitudinal movement parallel to the mandrel and a hold-down member supported above the mandrel for longitudinal movement, said hold-down member having a roller depressible against the work and permitting the work to be rotated upon and with the mandrel.

5. In a machine for forge welding seams of metal cylinders and the like, a horizontally disposed rotatable mandrel cylindrical in cross section and adapted to extend into the cylinder and support the same by rolling contact therewith, manually controllable power operated means for rotating said mandrel in either direction, laterally movable cylinder engaging rollers disposed below and on each side of the mandrel and manually shiftable toward or from each other and from the work, a hammer mounted above the mandrel for longitudinal movement parallel thereto, and a hold-down element mounted above the mandrel and manually shiftable longitudinally thereof and including a manually controllable roller shiftable toward or from the work on the mandrel.

6. In a machine for forge welding the seams of metal cylinders, a horizontally disposed rotatable mandrel adapted to extend into a cylinder and support the same, manually controllable power-operated means for rotating said mandrel in either direction, columns for supporting said mandrel for rotation, a track supported by said columns above the mandrel, a hold-down element longitudinally shiftable along said track and including a manually controllable roller extending transversely of the mandrel and adapted to be forced down on to the work supported thereby, a carriage mounted upon said track for longitudinal movement, a power operated forging hammer mounted on said carriage and coacting with the mandrel and longitudinally shiftable means mounted adjacent to the mandrel for heating the work.

7. In a machine for forge welding the seams of metal cylinders and the like, a horizontal rotatable mandrel adapted to extend into a cylinder and support the same, manually controllable power operated means for rotating said mandrel in either direction, columns for supporting said mandrel for rotation, a track supported by said columns above the mandrel, a hold-down element longitudinally shiftable along said track and including a manually controllable roller extending transversely of the mandrel and adapted to be forced down to the work supported thereby, a carriage mounted upon said track for longitudinal movement, a power operated forging hammer mounted on said carriage and coacting with the mandrel and a pair of blast nozzles having pipes extending parallel to said mandrel, the blast nozzles being spaced from the mandrel and from each other, means for adjusting the blast nozzles nearer to or further from the mandrel, means for adjusting the blast nozzles nearer to or further from each other, and means for manually shifting the blast nozzles longitudinally of the mandrel.

8. In a machine for forge welding the seams of metal cylinders and the like, a horizontally disposed rotatable mandrel adapted to extend into and support the cylinder columns supporting the mandrel, a platform mounted upon the columns to one side of the mandrel, a track mounted upon the columns above the mandrel and parallel thereto, means at the rear end of the mandrel whereby it may be rotated, manually controllable means disposed adjacent said platform whereby the mandrel may be caused to rotate in either direction, a pair of blast nozzles disposed adjacent the mandrel and having blast pipes extending parallel thereto, the blast pipes and nozzles being longitudinally adjustable parallel to the mandrel, means adjacent the platform for controlling the supply of fuel to the blast nozzles, laterally adjustable rollers controllable from the platform and engageable with the work to hold the work from oscillation, manually adjustable means controllable from said platform for shifting the blast nozzles toward or from each other, a hold-down element longitudinally shiftable upon said track, and including a roller depressible with the roller and the work on the mandrel, a carriage mounted upon the track for longitudinal movement parallel to the mandrel, and having a manually controllable power operated forge operating hammer controllable from said platform.

9. In a machine for forge welding the seams of metal cylinders and the like, a horizontally disposed rotatable mandrel, cylindrical in cross section and adapted to extend into and rotatably support the cylinder by rolling contact therewith and having a longitudinally rounded head upon which the work may be supported and rotated, a work heating means disposed in the path of movement of the work carried by the mandrel, and a power operated forge hammer adapted to engage the work on the mandrel head.

10. In a machine for forge welding the seams of metal cylinders and the like, a horizontally disposed mandrel adapted to extend into the cylinder and support the same, columns supporting the mandrel, one of said columns being vertically slotted, upper and lower blast pipes, a carriage for said pipes extending through said slot, tracks for said carriage mounted on the columns whereby the blast pipes may be longitudinally shifted parallel to the mandrel, opposed nozzles carried by the blast pipes, manually operable means whereby the blast pipes may be shifted nearer to or further from each other, manually controllable means whereby the blast may be regulated, a track mounted upon said columns above the mandrel, a hold-down means mounted upon said track for longitudinal movement therealong parallel to the mandrel, a power operated forge hammer, a carriage therefor mounted upon said track for longitudinal movement therealong, and power operated manually controllable means for rotating the mandrel in either direction.

11. In a machine for welding cylinders and the like, a power operated manually controllable rotatable mandrel cylindrical in cross section and adapted to extend into the cylinder being welded and rotatably support the same by rolling contact therewith while the cylinder is being welded and heated, manually controllable means whereby the mandrel may be rotated in either direction a power operated forge hammer disposed over the mandrel and adapted to be shifted longitudinally along the work, and means shiftable along the work parallel to the mandrel whereby the work may be heated, the rotatable mandrel causing the work to be carried from the heating means to a position beneath the hammer without removing the mandrel from the work.

12. In a machine for forge welding the seams of metal cylinders and the like, a horizontal rotatable mandrel cylindrical in cross section and adapted to extend into and rotatably support the cylinder by rolling contact therewith, a forging hammer associated with the mandrel, blast heating nozzles disposed intermediate the ends of the mandrel but radially spaced from the mandrel and adapted to receive therebetween the wall of the cylinder into which the mandrel is extended, and manually controllable means for rotating the mandrel in either direction.

In testimony whereof I hereunto affix my signature.

JOHN BARROW.